(12) United States Patent
Milman et al.

(10) Patent No.: US 9,716,700 B2
(45) Date of Patent: Jul. 25, 2017

(54) CODE ANALYSIS FOR PROVIDING DATA PRIVACY IN ETL SYSTEMS

(71) Applicant: International Business Machines Corporation, Armonk, NY (US)

(72) Inventors: Ivan M. Milman, Austin, TX (US); Martin Oberhofer, Bondorf (DE); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 14/626,366

(22) Filed: Feb. 19, 2015

(65) Prior Publication Data
US 2016/0248743 A1 Aug. 25, 2016

(51) Int. Cl.
*G06F 21/00* (2013.01)
*H04L 29/06* (2006.01)
(Continued)

(52) U.S. Cl.
CPC ........ *H04L 63/08* (2013.01); *G06F 17/30563* (2013.01); *G06F 21/6218* (2013.01); *H04L 63/0428* (2013.01)

(58) Field of Classification Search
None
See application file for complete search history.

(56) References Cited

U.S. PATENT DOCUMENTS 7,827,234 B2 11/2010 Eisenberger et al.
8,856,869 B1 * 10/2014 Brinskelle ............... H04L 63/08
726/12

(Continued)

FOREIGN PATENT DOCUMENTS

GB 2536348 A 9/2016
WO 2013182286 A1 12/2013

OTHER PUBLICATIONS

Dolezal, Jaroslav; Fidler, Jiri. On Parameter Optimization Approach to Optimal Control Problems. Conference Proceedings, International Conference on Systems, Man and Cybernetics. Pub. Date: 1993. http://ieeexplore.ieee.org/stamp/stamp.jsp?arnumber=384913.*

(Continued)

*Primary Examiner* — Jeremiah Avery
(74) *Attorney, Agent, or Firm* — Aaron N. Pontikos; Maeve Carpenter

(57) ABSTRACT

In an approach for providing data privacy in information integration systems, a method performed during compilation of an information integration job receives information regarding a data flow structure of the job to be executed, said data flow structure comprising at least one source system, one or more target entities, and at least one operator for modifying output data provided by the source system. The method determines data exit points at which output data are provided to the target entities and determines at least one non-trusted target entity. The method determines, for each non-trusted target entity, if at least one data field included in the output data provided to the non-trusted target entity is classified as sensitive information, and, if so, modifies the information integration job by including a masking operator directly before a data exit point associated with the non-trusted target entity in order to mask said sensitive information.

7 Claims, 4 Drawing Sheets

(51) Int. Cl.
  *G06F 17/30* (2006.01)
  *G06F 21/62* (2013.01)

(56) References Cited

U.S. PATENT DOCUMENTS

| | | | |
|---|---|---|---|
| 9,213,850 B2* | 12/2015 | Barton | H04L 41/00 |
| 2003/0088783 A1* | 5/2003 | DiPierro | G06F 21/6245 |
| | | | 713/189 |
| 2007/0192863 A1* | 8/2007 | Kapoor | G06F 9/505 |
| | | | 726/23 |
| 2007/0300306 A1 | 12/2007 | Hussain | |
| 2008/0189769 A1* | 8/2008 | Casado | G06F 21/6281 |
| | | | 726/4 |
| 2010/0241844 A1 | 9/2010 | Hussain et al. | |
| 2012/0259877 A1 | 10/2012 | Raghunathan et al. | |
| 2012/0272329 A1 | 10/2012 | Grammer et al. | |
| 2013/0117802 A1 | 5/2013 | Fendt | |
| 2013/0144901 A1 | 6/2013 | Ho et al. | |
| 2013/0191185 A1 | 7/2013 | Galvin | |
| 2014/0047551 A1 | 2/2014 | Nagasundaram et al. | |
| 2014/0090085 A1 | 3/2014 | Mattsson et al. | |
| 2014/0096261 A1 | 4/2014 | Boldyrev et al. | |
| 2015/0012467 A1* | 1/2015 | Greystoke | G06N 99/005 |
| | | | 706/12 |

OTHER PUBLICATIONS

Su, Yu; Ye, Ding; Xue, Jingling. Accelerating Inclusion-based Pointer Analysis on Hetergeneous CPU-GPU Systems. 2013 20th International Conference on High Performance Computing (HiPC). http://ieeexplore.ieee.org/stamp/stamp.jsp?arnumber=6799110.*

Dayal et al., "Data Integration Flows for Business Intelligence", EDBT '09 Proceedings of the 12th International Conference on Extending Database Technology: Advances in Database Technology, Mar. 24-26, 2009.

Gorawski et al., "Protecting Private Information by Data Separation in Distributed Spatial Data Warehouse", IEEE, The Second International Conference on Reliability and Security, 2007, ARES 2007, Apr. 10-13, 2007.

U.S. Appl. No. 15/054,672, filed Feb. 26, 2016.

List of IBM Patents or Patent Applications Treated as Related (Appendix P), filed Feb. 26, 2016.

"Code Analysis for Providing Data Privacy in ETL Systems", German Patent Application No. 102016102945.9, filed on Feb. 19, 2016, 27 pages.

Patent Act 1977: Combined Search and Examination Report under Sections 17 and 18(3), Application No. GB1601584.4, dated Jul. 11, 2016, 7 pages.

* cited by examiner

CODE ANALYSIS FOR PROVIDING DATA PRIVACY IN ETL SYSTEMS

BACKGROUND

The invention relates to information integration environments. More in detail, the invention relates to a method for providing data privacy in information integration environments.

Business information such as customer, patient or employee information may be governed by data privacy regulations in many countries (e.g. Germany's Federal Data Protection Act or European Union (EU) Directive 95/46/EC on the Protection of Personal Data) and must be protected against unauthorized access. Other data objects might be sensitive for competitive business reasons and should be protected against unauthorized access. This should also be the case during information integration processing—which is not the case today exposing sensitive data to risk due to unauthorized access.

In information integration processing, a set of data is extracted from one or more source systems, transformed by using one or more operators and provided to one or more target entities. Such information integration systems are also known as Extract Transform Load systems (ETL systems). ETL systems are commonly used to integrate data from multiple applications. For example, a cost accounting system may combine data from payroll, sales and purchasing source systems. Above-mentioned data privacy regulations have to be also considered during information integration processing.

Disadvantageously, information integration systems, such as ETL systems, do not comprise effective tools for implementing said data privacy regulations.

SUMMARY

It is an objective of embodiments of the invention to provide a method for implementing effective data privacy protection in information integration systems. Preferred embodiments are given in the dependent claims. If not explicitly indicated otherwise, embodiments of the invention can be freely combined with each other.

According to a first aspect, a method for providing data privacy in information integration systems is provided. The method performs during compilation of an information integration job the steps of:
  receiving information regarding a data flow structure of the information integration job to be executed, said data flow structure comprising at least one source system, at least one target entity and at least one operator for modifying or transforming data provided by the source system;
  determining at least one data exit point at which output data are provided to a target entity;
  determining at least one non-trusted target entity;
  determining for each non-trusted target entity if at least one data field included in the output data provided to the non-trusted target entity comprises sensitive information;
  if at least one data field included in the output data provided to a non-trusted target entity comprises sensitive information, either tag the information integration job in order to disable execution of said information integration job or modify the information integration job by including a masking operator directly before the data exit point associated with the non-trusted target entity in order to mask said sensitive information.

Advantageously, the data fields are transmitted in an unencrypted way through the data flow structure. Thereby, the data fields are available in a non-ciphered form and can thereby be modified or transformed by the respective operators included in the data flow structure. The sensitive data are masked only at data exit points at which sensitive information is leaving the secured data flow structure towards non-trusted target entities, for example, target entities in which data are stored in an unencrypted way.

According to further embodiments, the at least one non-trusted target entity is determined based on metadata correlated with the respective target entity. For example, the information integration system may comprise a metadata repository for storing metadata correlated with the target entities. The metadata may be indicative for the trust level of a respective target entity. So, the information integration system may be able to classify the target entities in trusted and non-trusted target entities.

According to further embodiments, non-trusted target entities are determined based on the identification data of the user authenticated at the information integration system and/or target entity. Target entities may be also constituted by a user interface displaying data in a data viewer application (e.g. data viewer option of a persistency connector, e.g. data base connector stage or file stage etc.). Thereby, sensitive information may be displayed to administrators or developers of the information integration system in clear form. The trust level of such target entity may depend on the authenticated user. In order to avoid violation of data privacy regulations, the trust level of the target entity is determined based on the trust level of the authenticated user. Thereby, data privacy is also obtained in development environments of the information integration system.

According to further embodiments, each field of data provided by a source system or provided by an operator is analyzed regarding sensitive information in order to determine whether the output data derived from said field of data comprises sensitive information. So, during analyzing, the module providing data privacy may go back and analyze where the output data is coming from in order to derive information regarding the sensitivity of data.

According to further embodiments, classifying a field of output data or a field of data provided by a source system or provided by an operator as sensitive information is done based on analysis of metadata provided in association with the respective field of data. For example, the information integration system may comprise a metadata repository for storing metadata correlated with each field of data. The metadata may be indicative for the sensitivity level of the information comprised within the data field. So, the information integration system may be able to classify the data fields in sensitive and non-sensitive data fields.

The classification of data fields in sensitive and non-sensitive data fields and the classification of target entities in trusted and non-trusted target entities may be performed based on data privacy policies stored in a repository, e.g. the metadata repository. The classifications may depend on the strength of a respective data privacy policy. For example, according to a weak data privacy policy, a data field may be classified as non-sensitive, whereas in a stronger data privacy policy, the same data field may be classified as sensitive.

According to further embodiments, classifying a field of output data or a field of data provided by a source system or provided by an operator as sensitive information is done based on text analytics or based on data classification algorithms marking a field of data as sensitive information based on data classification. By using text analytics, the information included in a data field is analyzed regarding specific pattern in order to derive information regarding which kind of data is included in the respective data field. Thereby, also data fields which may not be listed within the metadata repository can be classified regarding sensitivity of information.

According to further embodiments, a field of output data or a field of data provided by an operator is derived based on a combination of at least two fields of data and the field of data resulting from said combination is identified as sensitive depending the combined fields of data. For example, a data field comprising non-sensitive information may be combined with a data field comprising sensitive information. The data field derived by said combining may also be sensitive. According to another example, both data fields to be combined do not comprise sensitive information but after the combination, the data field comprising both information may be sensitive (e.g. name associated with credit card number).

According to further embodiments, a field of data provided by an operator is identified as sensitive information based on the type of operator and/or the functionality of the operator.

According to further embodiments, after identifying a field of data as sensitive information, the information integration job is analyzed in order to determine at least one further field of data comprising identical data and mark said further field of data also as sensitive information. Thereby, the sensitivity classification of data fields can be accelerated and processing power for determining the sensitivity level is saved.

According to further embodiments, the target entity to which said further field of data (also classified as comprising sensitive data) is provided is classified as non-trusted target entity based on metadata provided to the target entity and/or based on the identification data of the user authenticated at the information integration system and/or target entity. So, also said further sensitive field of data has to be masked by a masking operator in order to protect said sensitive information against unauthorized access.

According to further embodiments, in case that target entity information associated with a target entity is parameterized and at compile time it is known that sensitive data is received by said target entity, the parameterization is disabled. For example, a dummy parameter may be used instead of the parameter to be received during run time of the information integration job in order to avoid a routing of sensitive information to an untrusted target entity.

According to further embodiments, in case that target entity information associated with a target entity is parameterized and at compile time it is known that sensitive data is received by said target entity, a nested job is implemented for assessing the value of the parameterized target entity information in order to determine whether the information provided by said target entity has to be masked or not. Thereby, the provision of output data to a target entity which is defined by receiving of a parameter is further supported without any violation of data privacy regulations.

According to further embodiments, the masking operator is configured to mask the sensitive information by removing said sensitive information or by replacing said sensitive information by a dummy value.

According to further embodiments, the data are transmitted from the source system through said at least one operator to the target entity in unencrypted form. So, within the data flow structure of the information integration system, all operators may work because the data are not encrypted. The data privacy regulations are implemented only at exit points of the data flow structure, at which sensitive information is provided to untrusted target entities.

According to a second aspect, a data processing system comprising a storage entity and a processing entity is provided. The data processing system is configured to process an information integration job, the data processing system being further configured to:
  receive, during compilation of said information integration job, information regarding a data flow structure of the information integration job to be executed, said data flow structure comprising at least one source system, at least one target entity and at least one operator for modifying data provided by the source system;
  determine, during compilation of said information integration job, at least one data exit point at which output data are provided to a target entity;
  determine, during compilation of said information integration job, at least one non-trusted target entity;
  determine, during compilation of said information integration job, for each non-trusted target entity if at least one data field included in the output data provided to the non-trusted target entity comprises sensitive information;
  if at least one field included in the output data provided to a non-trusted target entity comprises sensitive information, either tag the information integration job in order to disable execution of said information integration job or modify the information integration job by including a masking operator directly before the non-trusted data exit point associated with the non-trusted target entity in order to mask said sensitive information.

According to a third aspect, a computer-readable medium is provided. The computer-readable medium comprises computer-readable program code embodied therewith which, when executed by a processor, cause the processor to execute a method as mentioned above.

The term "target entity", as used herein, shall extend to any hardware or software entity which may be configured to receive data, specifically output data via a data exit point of the data flow structure. Target entities may be, but are not limited to databases, storage entities, user interfaces, log files or any other means for providing data to a computing system or an information recipient.

The term "operator", as used herein, shall extend to any kind of function adapted to handle or treat data. Operators may be, but are not limited to join-operators, filter-operators, transform-operators, switch-operators, copy-operators or modify-operators.

The term "output data", as used herein, may refer to any kind of data leaving the data flow structure towards a target entity. In other words, output data are provided at a data exit point which is located at the end of the data flow structure just before the target entity.

The term "sensitive information", as used herein, may refer to any kind of information which has to be protected against unauthorized access based on data privacy policies.

The term "non-trusted target entity" or "untrusted target entity", as used herein, may refer to any target entity which does not fulfil one or more data privacy policies. For example, a non-trusted target entity may be a database in which data are stored in an unencrypted way.

DETAILED DESCRIPTION

Figure 1:
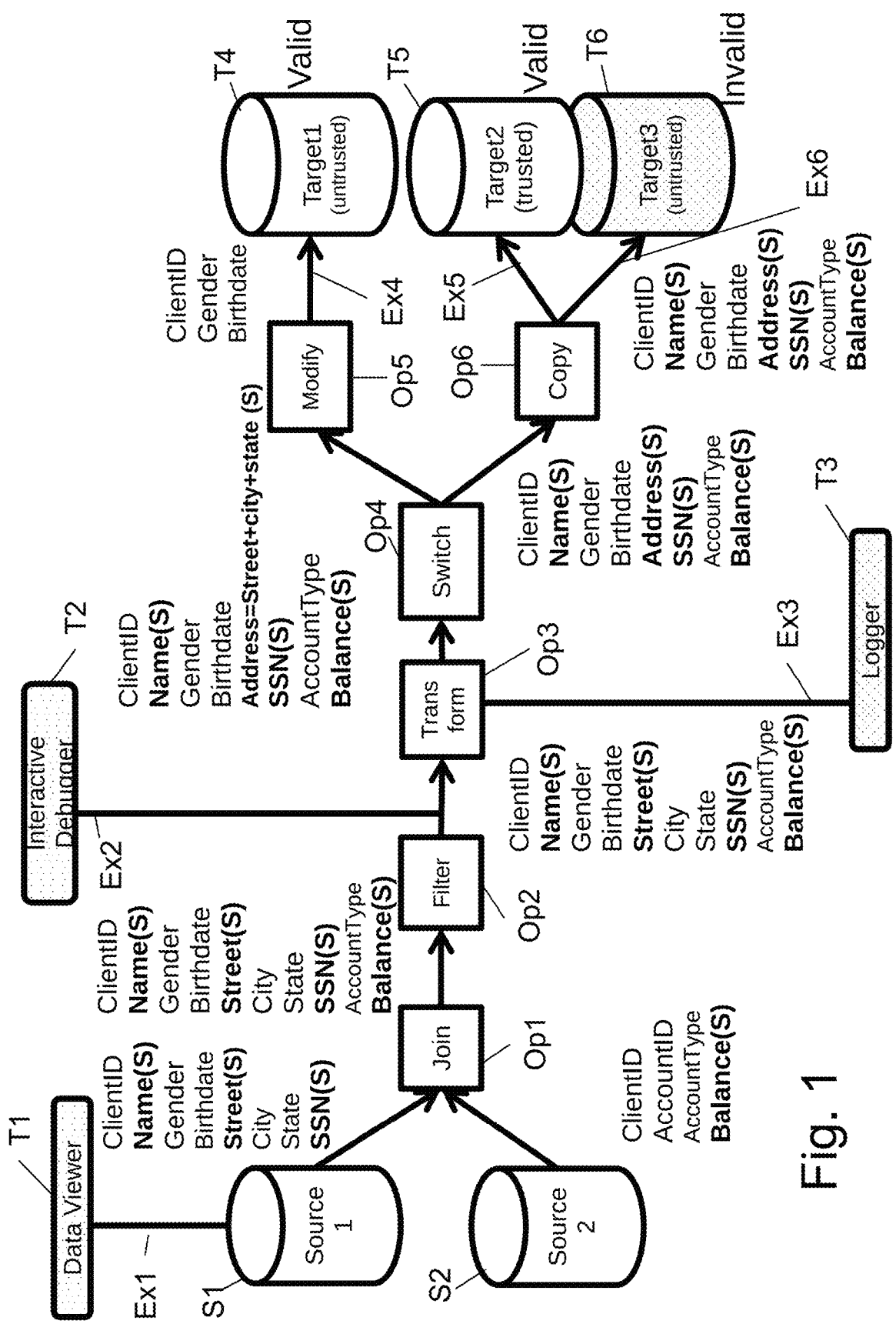
FIG. 1 schematically illustrates an example data flow structure of an information integration system, in accordance with an embodiment of the present invention.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

FIG. 1 illustrates the data flow structure in an information integration system 1 based on a schematic block diagram, in an embodiment of the present invention. Said data flow structure comprises a set of sources, according to the present embodiment a first source system S1 and a second source system S2 for providing data, for example, input data stored within a database. The data flow structure further comprises a set of operators Op1-Op6. Said operators Op1-Op6 may form a data transformation structure for transforming the data provided by the source systems S1, S2 into output data provided to target entities T1-T6. Said operators Op1-Op6 may be arranged according to a data flow design stored within one of said source systems S1, S2. The data flow design defines the type of operators Op1-Op6 and the connections between the operators Op1-Op6 in order to derive appropriate output data at the output of the data processing structure. The data processing structure may include different types of operators Op1-Op6, for example one or more join-operators, filter operators, transform-operators, switch-operators and/or modify-operators.

The data transformation structure may comprise a tree-like structure for providing output data derived from different tree branches to different target entities T1-T6. Said target entities T1-T6 may be data repositories of the information integration system (for example scratch discs of an ETL system). In addition, said target entities T1-T6 may include a data viewer (cf. target entity T1), a debugger (cf. target entity T2), specifically an interactive debugger, for debugging data provided by an operator Op1-Op6, or a logger (cf. target entity T3). Said data viewer may be included in said source system S1, S2, for example, a database connector stage or files stage, as an option in order to provide a user interface to developers or administrators for showing data stored in the source system S1, S2 in clear form. Above-mentioned debuggers are configured to allow to pause a piece of information integration logic or ETL logic at runtime in order to inspect the current data values stored within main memory at that point of time. In addition, the data flow structure may define a logger as a target entity T3. In case an error occurs during data processing, sensitive information may be written to trace files by said logger in order to provide information regarding the occurred error to an administrator and/or developer. In other words, the target entities T1-T6 may not only include targets included in the regular data flow structure of the information integration system but also user interfaces (debugging tools, ETL job designers, job administrators etc.) and log files of the information integration system itself.

According to the present embodiment, the information integration job receives a first set of input data from the first source system Si and a second set of input data from the second source system S2. Said first and second set of input data may be received by a join-operator OP1 in order to join said first and second set of input data to a single set of data. Said single set of data may pass through one or more further operators Op2, Op3, for example a filter-operator Op2 and a transform-operator Op3. In the following, data provided by the preceding operators are provided to a switch-operator Op4. Said switch-operator Op4 is adapted to split the single set of data into multiple subsets of data, each subset of data comprising some or all data comprised within the single set of data. In other words, by means of the switch-operator Op4 the data flow structure is split into several data flow branches. After said switch-operator, there may be additional operators Op5, Op6 provided within the data flow structure in order to further transform the data provided by the switch-operator. It is worth mentioning, that the above-mentioned arrangement of operators is a mere example for a data flow structure of an information integration job and has no limiting character with respect to the present invention.

According to the present embodiment, the data flow structure comprises three target entities T1-T3 which receives data at the source systems S1, S2 or within the data flow of the data flow structure and three target entities T4-T6 which receives output data at the end nodes of the data flow structure, i.e. output data which passed through the whole data flow structure.

The input data provided by the first and/or second source S1, S2 may provide sensitive information. More in detail, the first and/or second source S1, S2 may provide input data comprising one or more data fields wherein the data fields may comprise sensitive information which has to be protected against unauthorized access. Said sensitive information is highlighted in FIG. 1 by bold field identifiers and indicated by an "(S)" appearing after the field identifier.

The assessment of data fields comprised within the input data if said data fields contain sensitive information may be performed in different ways. For example, the data fields may be compared with metadata provided by business glossaries, data profiling tools etc. The sensitivity of information may be assessed based on said metadata. For example, a data profiling tool may have marked certain fields of input data as social security number (SSN), credit card number etc. based on the detected format pattern. The information integration system may comprise a metadata repository storing classification information. Said classification information associated with the respective data fields may mark the data field comprising said detected sensitive information as sensitive. Alternatively, the sensitivity of the information may be assessed based on text analytics performed on the data or data models comprised within a repository. Finally, the sensitivity of information may be derived by analyzing annotations of data, specifically of data models, comprised within the source system S1, S2. Said annotations may mark the data fields as sensitive based on classification of said data fields. In addition, the decision whether a data field includes sensitive information may be based on the type of operator which handles the respective data field and/or the knowledge of the function of the operator.

Finally, the sensitivity of data fields may result in a combination or transformation of sensitive data and non-sensitive data. For example, the data field "address" may result off a combination of data fields "street", "city" and "state". The data field "street" has been assessed as sensitive data in the source system S1. Therefore, also the data field "address" comprising said sensitive information "street" is assessed as being sensitive information (cf. transform operator OP3).

In order to provide data privacy in information integration systems, the data privacy is established at exit points at which the data are leaving the data flow structure in order to be stored in a target system, to be displayed in a user interface of a data viewer or interactive debugger or written to a log file. In other words, all data are transmitted unencrypted within the information integration system and data privacy is provided at the exit points of the information integration system where said data are leaving the system. The system according the embodiment of FIG. 1 includes the exit points Ex1- Ex6.

Data privacy regulations are only to be considered at non-trusted data exit points, which are in the present embodiment the data exit point Ex4 and Ex6 constituted by the target entities T4 and T6. Furthermore, data privacy regulations have only to be considered for data fields comprising sensitive information. So, besides determining data fields which comprise sensitive information, the information integration system may have to determine the non-trusted data exit points correlated with non-trusted target entities. According to an embodiment, the non-trusted target entities T4, T6 may be determined based on metadata correlated with the respective target entities T4, T6. For example, the information integration system may comprise a metadata repository, said metadata repository storing metadata comprising information regarding the trust level of the respective target entities T1-T6. More specifically, the metadata may indicate whether the target entity T1-T6 is a trusted target entity or a non-trusted target entity. So, the trust level of a respective target entity can be determined by accessing said metadata repository.

The information integration system may be adapted to implement different data privacy policies. For example, there may be multiple data privacy policies, wherein said policies differ in the strength of data privacy protection. In order to implement said different data privacy policies, the metadata repository may include multiple entries for each target entity T1-T6, wherein each entry refers to a specific data privacy policy. Similarly, also the decision whether a data field comprises sensitive information or not may be made with respect to data privacy policies, i.e. the information included within a data field may be treated in a stricter data privacy policy as sensitive information whereas in a weaker data privacy policy, the information of the same data field may be treated as non-sensitive information.

In cases where information is provided to a user interface (for example, data viewer or interactive debugger) or provided to a logging entity, the decision of trust level of said data exit point is chosen based on the currently authenticated user. For example, each authenticated user may be associated with metadata indicating the trust level of said user. In case a user with a high trust level is authenticated, the respective data exit point may be treated as trusted exit point, whereas in case a user with a low trust level is authenticated, the respective data exit point may be treated as non-trusted exit point.

Figure 2:
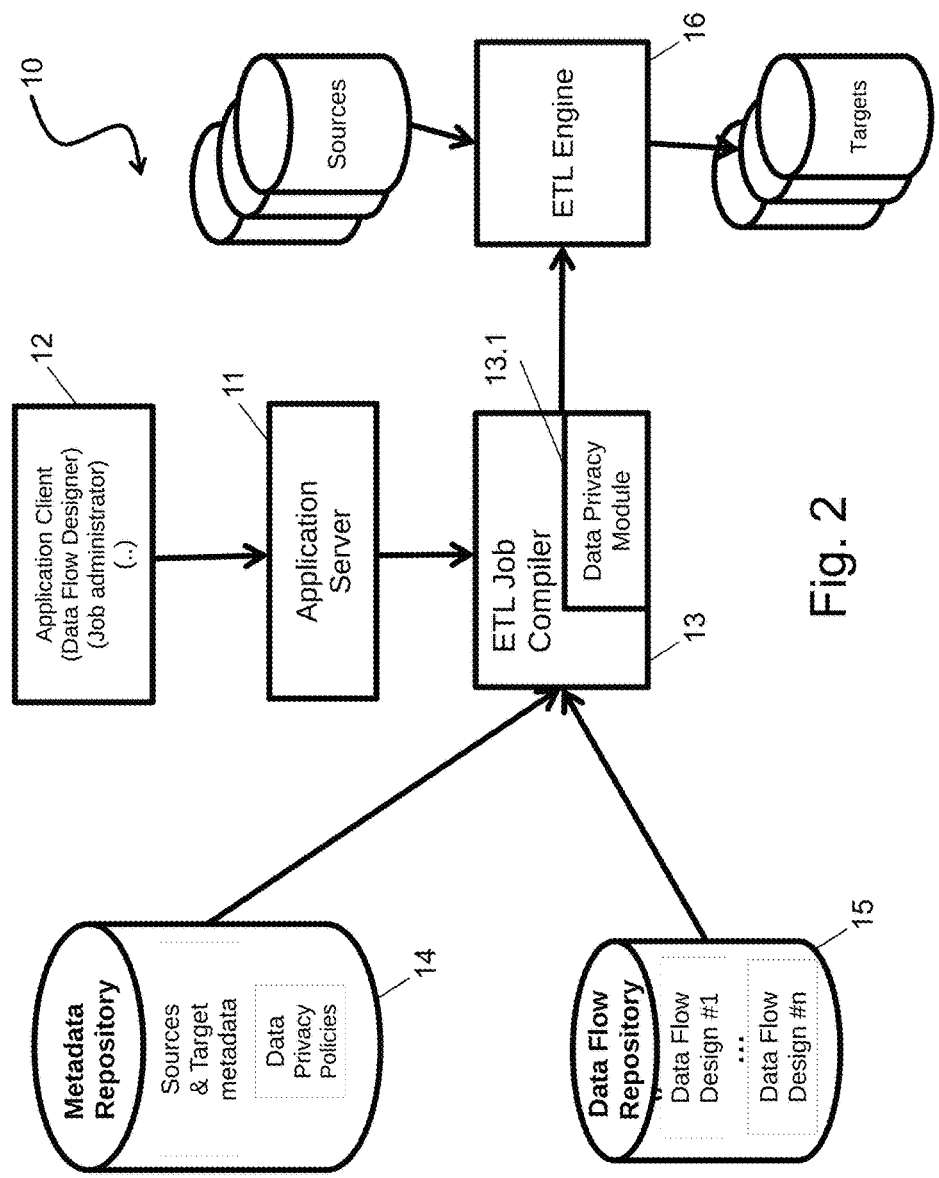
FIG. 2 schematically illustrates an information integration environment including a compiler entity for providing data privacy of sensitive information, in accordance with an embodiment of the present invention.

FIG. 2 shows the architecture of an information integration environment, specifically the architecture of an Extract-Transform-Load (ETL) environment 10, in accordance with an embodiment of the present invention. The ETL environment 10 comprises an application server 11 which provides the ETL application. The application server 11 is connected to an application client 12. The application client 12 provides a user interface for operating the ETL application. More in detail, a user may design a data flow structure of an ETL job based on the data flow designer or may administrate an ETL job using a job administrator.

The application server 11 may comprise an ETL job compiler 13. The ETL job compiler 13 is adapted to receive a data flow structure designed within a data flow designer tool and generate an ETL job based on the provided data flow structure. The ETL job compiler 13 may be connected with a metadata repository 14 and data flow repository 15. Said metadata repository 14 may provide metadata correlated with source systems S1, S2 and target entities T1-T6. Furthermore, said metadata repository 14 may provide data privacy policies, based on which different levels of data privacy may be implemented. In addition, the metadata repository 14 may comprise metadata information correlated with input data, specifically metadata information regarding the sensitivity of information comprised within a specific data field. The data flow repository 15 may provide a set of data flow designs which can be used for designing the ETL job.

The ETL job compiler 13 is adapted to receive a trigger of the application client 12 for compiling an ETL job based on a data flow structure in order to generate an ETL job executable in an ETL engine 16. The ETL job compiler 13 comprises a data privacy module 13.1 executing data privacy actions in order to implement data privacy policies. More in detail, the data privacy module 13.1 may analyze the data flow structure provided by the application client 12 in order to determine source systems S1, S2 and target entities T1-T6 used in the data flow structure. Furthermore, the data privacy module 13.1 may analyze the input data or metadata correlated with said input data in order to determine which fields of data comprise sensitive information. In addition, the data privacy module 13.1 may gather information regarding the trust level of the target entities T1-T6 receiving output data in order to determine trusted target entities T1, T2, T3 and T5 and non-trusted target entities T4 and T6.

The data privacy module 13.1 may further determine which output data provided to a target entity T1-T6 at a data exit point Ex1-Ex6 of data flow structure comprises sensitive data fields, i.e. which data field comprises sensitive information with respect to the used data privacy policy. Based on said gathered information, the data privacy module 13.1 may determine if sensitive data fields are provided to non-trusted target entities. In case sensitive data fields are provided to non-trusted target entities (for example, target entity T6 in FIG. 1), the data privacy module 13.1 may modify or rewrite the ETL job by inserting a data masking operator MO in order to disguise sensitive data fields before leaving the data exit point Ex6 towards the non-trusted target entity T6. Alternatively, the data privacy module 13.1 may mark or tag the compiled ETL job in order to prevent executing of said ETL job. Said tagging may be necessary in cases when the ETL job comprises parameters which may lead to security holes such that compliance with data privacy regulations cannot be guaranteed.

After performing the data privacy actions, the modified ETL job may be provided to the ETL engine 16 in order to execute the ETL job. Because of the modifications implemented by the data privacy module 13.1, sensitive data fields may be protected against unauthorized access said by guaranteeing data privacy policies.

Figure 3:
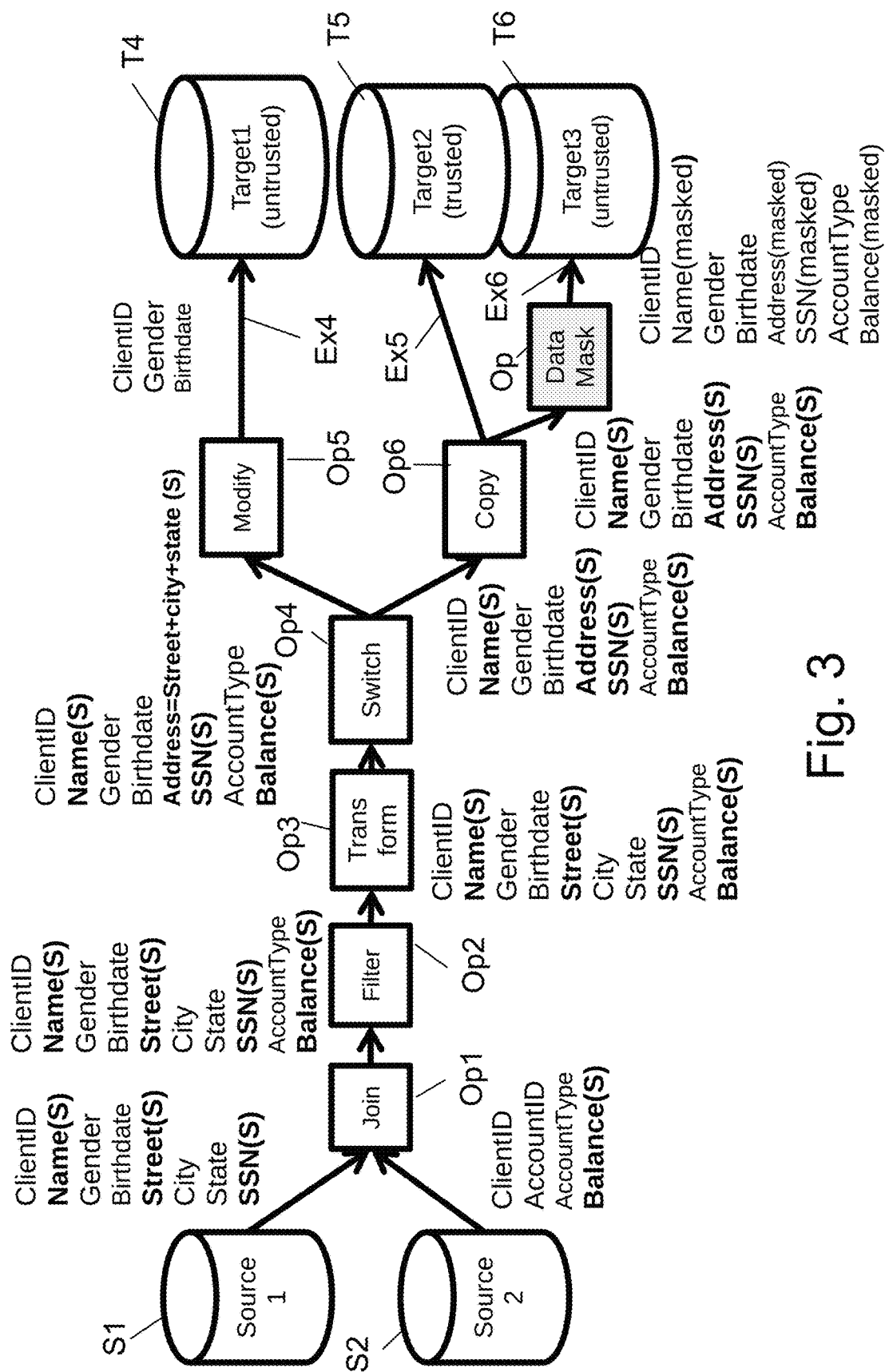
FIG. 3 schematically illustrates an example data flow structure of an information integration system including a data masking operator, in accordance with an embodiment of the present invention.

FIG. 3 shows a modified data flow structure which has been modified by the data privacy module 13.1 in order to guarantee protection against unauthorized access, in accordance with an embodiment of the present invention. The data flow structure comprises an additional data masking operator MO located directly before the data exit point Ex6 via which sensitive data should have been provided to the non-trusted target entity T6. The data masking operator MO may receive one or more data fields. Data fields comprising sensitive information may comprise a marking or tag in order to characterize the respective data field as sensitive (as indicated by the tag (S)). The data masking operator MO may be adapted to mask the sensitive data fields. Said masking may blot out sensitive information, i.e. the sensitive information is not legible anymore. For example, the sensitive information may be at least partially replaced by random data, e.g. XXXaXXXbXXXc. Alternatively, the sensitive data field may be removed completely in order to guarantee data privacy policies. Once the sensitive data field went through the masking operator MO, the sensitive data field is converted in a non-sensitive data field because of said masking (as indicated in FIG. 3 by removing the bold printing and an indication of "(masked)" appearing after the field identifier).

It is worth mentioning that also target entity T4 is a non-trusted target entity. However, the data fields provided at data exit point Ex4 to target entity T4 comprise only non-sensitive information. Therefore, no data masking operator that is needed directly before data exit point Ex4.

The situation may occur that the data flow structure provided to the ETL job compiler 13 comprises parameters, said parameters enabling a variability of the target entity. In other words, during the execution of the ETL job, the target system to which output data is provided can be changed according to said target entity parameter. By using such parameterization, security holes may occur because the target entity cannot be determined at compilation time. Therefore, in order to guarantee data privacy policies, it might be necessary to tag the compiled ETL job as non-executable in order to avoid such security holes. Alternatively, it may be possible to disable an override action of the parameter included in the ETL job. Thereby, the parameter is set to a default value and by blocking the change of said parameter the change of target entity is inhibited. According to another alternative solution of said problem, during compilation a nested job may be included in the ETL job in order to assess the entered parameter defining the target entity. After assessing the trust level of the target entity identified by the entered parameter, a masking may be applied to the sensitive output data in case of a non-trusted target entity or the sensitive output data may be passed through (in case of a trusted target entity).

Figure 4:
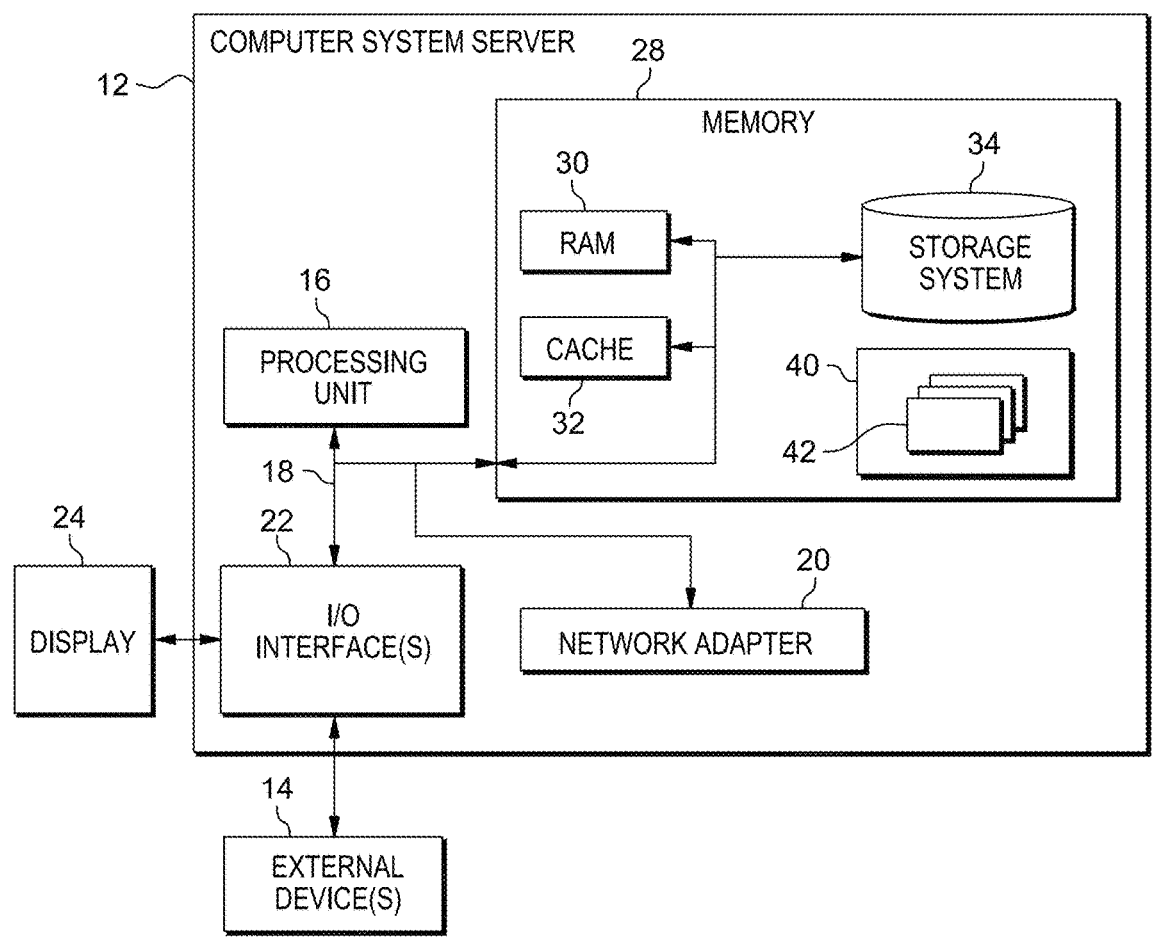
FIG. 4 is a block diagram of an exemplary computer system, in accordance with an embodiment of the present invention.

FIG. 4 is a block diagram of a computer system/server 12, in accordance with an embodiment of the present invention. Computer system/server 12 is only illustrative and is not intended to suggest any limitation as to the scope of use or functionality of embodiments of the invention described herein.

As shown in FIG. 4, computer system/server 12 is shown in the form of a general-purpose computing device. In an embodiment, computer system/server 12 represents a data processing system. The components of computer system/server 12 may include, but are not limited to, one or more processors or processing units 16, a system memory 28, and a bus 18 that couples various system components, including system memory 28, to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, or computer readable storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The foregoing description of embodiments has been presented for purposes of illustration and description. It is not intended to be exhaustive or to limit embodiments of the present invention to the precise form disclosed. Modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations without leaving the scope of the underlying principle ideas.

What is claimed is:

1. A data processing system comprising a storage entity and a processing entity, the data processing system being configured to process an information integration job, the data processing system being further configured to:
   receive, during compilation of said information integration job, information regarding a data flow structure of an information integration job to be executed, said data flow structure comprising at least one source system, one or more target entities, and at least one operator for modifying output data provided by the at least one source system;
   determine, during compilation of said information integration job, a set of data exit points at which the output data are provided to the one or more target entities;
   determine, during compilation of said information integration job, at least one non-trusted target entity of the one or more target entities;
   determine, during compilation of said information integration job, for each non-trusted target entity, if at least one data field included in the output data provided to the non-trusted target entity is classified as sensitive information; and
   if at least one field included in the output data provided to a non-trusted target entity is classified as sensitive information, modify the information integration job by including a masking operator directly before a data exit point associated with the non-trusted target entity in order to mask said sensitive information.

2. The data processing system according to claim 1, further configured to, wherein if at least one field included in the output data provided to a non-trusted target entity is classified as sensitive information, tag the information integration job in order to disable execution of said information integration job.

3. The data processing system according to claim 1, wherein the at least one non-trusted target entity is determined based on metadata correlated with the one or more target entities.

4. The data processing system according to claim 1, wherein the at least one non-trusted target entity is determined based on identification data of a user authenticated at one or more of: the information integration system and said target entity.

5. The data processing system according to claim 1, wherein each field of data provided by the at least one source system is analyzed regarding sensitive information in order to determine whether output data derived from said field of data is classified as sensitive information.

6. A computer readable storage medium comprising computer readable instructions which, when executed by a processor of a data processing system, cause the processor to execute a method for providing data privacy in an information integration system, the method performing during compilation of an information integration job the steps of:
   receiving information regarding a data flow structure of an information integration job to be executed, said data flow structure comprising at least one source system, one or more target entities, and at least one operator for modifying output data provided by the at least one source system;
   determining a set of data exit points at which the output data are provided to the one or more target entities;
   determining at least one non-trusted target entity of the one or more target entities;
   determining, for each non-trusted target entity, if at least one data field included in the output data provided to the non-trusted target entity is classified as sensitive information; and
   if at least one data field included in the output data provided to the non-trusted target entity is classified as sensitive information, modify the information integration job by including a masking operator directly before a data exit point associated with the non-trusted target entity in order to mask said sensitive information.

7. The computer readable storage medium according to claim 6, wherein if at least one data field included in the output data provided to the non-trusted target entity is classified as sensitive information, tagging the information integration job in order to disable execution of said information integration job.

* * * * *